United States Patent
Fu et al.

(10) Patent No.: US 12,037,290 B2
(45) Date of Patent: Jul. 16, 2024

(54) DOPED PEROVSKITE BARIUM STANNATE MATERIAL WITH PREPARATION METHOD AND APPLICATION THEREOF

(71) Applicant: GUANGDONG FENGHUA ADVANCED TECHNOLOGY HOLDING CO., LTD., Guangdong (CN)

(72) Inventors: Zhenxiao Fu, Guangdong (CN); Jianmei Liu, Australian Capital Territory (AU); Haidong Ren, Guangdong (CN); Yun Liu, Australian Capital Territory (AU); Terry James Frankcombe, Australian Capital Territory (AU); Xiuhua Cao, Guangdong (CN); Shiwo Ta, Guangdong (CN)

(73) Assignee: GUANGDONG FENGHUA ADVANCED TECHNOLOGY HOLDING CO., LTD., Zhaoqing (CN)

( * ) Notice: Subject to any disclaimer, the term of this patent is extended or adjusted under 35 U.S.C. 154(b) by 674 days.

(21) Appl. No.: 17/246,733

(22) Filed: May 3, 2021

(65) Prior Publication Data
US 2021/0300827 A1     Sep. 30, 2021

Related U.S. Application Data

(63) Continuation of application No. PCT/CN2020/082581, filed on Mar. 31, 2020.

(30) Foreign Application Priority Data

Mar. 27, 2020   (CN) .......................... 202010233747.7

(51) Int. Cl.
C04B 35/457     (2006.01)
C04B 35/626     (2006.01)
(Continued)

(52) U.S. Cl.
CPC ........ *C04B 35/457* (2013.01); *C04B 35/6262* (2013.01); *C04B 35/6264* (2013.01);
(Continued)

(58) Field of Classification Search
CPC ............................ C04B 35/457; H01G 4/1209
See application file for complete search history.

(56) References Cited

U.S. PATENT DOCUMENTS 5,057,478 A * 10/1991 Abe ........................ C08F 10/00
502/159

OTHER PUBLICATIONS

Shail Upadhyay et al., Dielectric relaxation and conduction in the system Ba1—xLaxSn1—xCrxO3, Journal of Materials Science: Materials in Electronics, Mar. 2001, pp. 165-172, vol. 12.

(Continued)

*Primary Examiner* — Matthew E. Hoban

(57) ABSTRACT

Disclosed herein is a doped perovskite barium stannate material, which has a chemical general formula of $BaA_xB_xSn_{1-2x}O_3$, where A is at least one of In, Y, Bi and La; B is at least one of Nb and Ta, and $0<x\leq0.025$. The doped perovskite barium stannate material disclosed in the invention has a high dielectric constant, low dielectric loss and good temperature-stability, and it can be used not only as low-frequency ceramic capacitor dielectrics, but also as microwave dielectric ceramics because of its excellent microwave dielectric properties, implying the potential application in the field of microwave communication. What's more, disclosed is a method to prepare the doped perovskite barium stannate material and the application of the doped perovskite barium stannate material in a low-frequency ceramic capacitor or microwave communication dielectric ceramics.

8 Claims, 7 Drawing Sheets

(51) Int. Cl.
*C04B 35/63* (2006.01)
*C04B 35/64* (2006.01)
*H01G 4/12* (2006.01)

(52) U.S. Cl.
CPC .... *C04B 35/62695* (2013.01); *C04B 35/6303* (2013.01); *C04B 35/64* (2013.01); *H01G 4/1209* (2013.01); *C04B 2235/3224* (2013.01); *C04B 2235/3227* (2013.01); *C04B 2235/3293* (2013.01); *C04B 2235/3409* (2013.01); *C04B 2235/442* (2013.01); *C04B 2235/604* (2013.01); *C04B 2235/6562* (2013.01); *C04B 2235/6567* (2013.01); *C04B 2235/662* (2013.01); *C04B 2235/768* (2013.01)

(56) References Cited

OTHER PUBLICATIONS

Shail Upadhyay et al., Synthesis, structure and electrical behaviour of lanthanum-doped barium stannate, Journal of Physics D: Applied Physics, Apr. 28, 2004, pp. 1483-1491, vol. 37.

\* cited by examiner

DOPED PEROVSKITE BARIUM STANNATE MATERIAL WITH PREPARATION METHOD AND APPLICATION THEREOF

CROSS-REFERENCE TO RELATED APPLICATIONS

The present application is a Continuation Application of PCT application No. PCT/CN2020/082581 filed on Mar. 31, 2020, which claims the benefit of Chinese Patent Application No. 202010233747.7 filed on Mar. 27, 2020, the contents of which are hereby incorporated by reference.

TECHNICAL FIELD

The invention relates to a dielectric ceramic material, especially to a doped perovskite barium stannate material with a preparation method and application thereof.

BACKGROUND

In the field of microwave (300 MHz~300 GHz), with the rapid development of information technology and wireless communication, it is urgent to manufacture microwave devices with features of miniaturization, high reliability, good temperature-stability, and high quality. Therefore, microwave dielectric ceramics are required to simultaneously possess high dielectric constants, low dielectric loss and excellent temperature-stability.

Because the size of microwave devices is inversely proportional to the square root of the dielectric constant of the dielectric material, the dielectric material is required to have a high dielectric constant to miniaturize microwave devices. Many studies have shown that ferroelectric materials, e.g. $BaTiO_3$, have high dielectric constants. However, their dielectric constants greatly depend on temperature, which implies ferroelectric materials cannot be used in microwave devices. So far, the most used microwave dielectric ceramics include $BaO-Ln_2O_3-TiO_2$ (BLT) microwave dielectric ceramics with tungsten bronze structure, modified $CaTiO_3$ microwave dielectric ceramics and $Ba(Zn_{1/3}Ta_{2/3})O_3$ perovskite microwave dielectric ceramics, and so on. The dielectric constant of these aforementioned ceramics is lower than 100, which is much smaller than the dielectric constant in the invention.

In "Dielectric relaxation and conduction in the system $Ba_{1-x}La_xSn_{1-x}Cr_xO_3$" published in the Journal of Materials Science: Materials in Electronics and "Synthesis, structure and electrical behaviour of lanthanum-doped barium stannate" published in the Journal of Physics: Applied Physics, Shail Upadhyay, et al. has discussed dielectric properties of $Ba_{1-x}La_xSn_{1-x}Cr_xO_3$ and $Ba_{1-x}La_xSnO_3$ at the frequency range of 10 Hz to 5 MHz. Although dielectric constants of the two materials can reach $10^3$ or more, they are highly dependent on frequency and temperature.

SUMMARY

An objective of the invention is to provide a doped perovskite barium stannate material, and the preparation method and application thereof, to overcome shortcomings in the previous technologies.

In order to achieve the abovementioned objective, the technical solution adopted in the invention is: a doped perovskite barium stannate material with a chemical general formula of $BaA_xB_xSn_{1-2x}O_3$, where A is In, Y, Bi, or La, or a mixture of two or more of these; B is Nb or Ta, or a mixture of both; and $0<x\leq0.025$.

The doped perovskite barium stannate material of the invention has a high dielectric constant, low dielectric loss and good temperature-stability. It can not only be used as low-frequency ceramic capacitor dielectrics, but also has excellent properties suitable for microwave ceramics, which implies great potential in the application of microwave communication.

Another objective of the invention is to provide a preparation method of the doped perovskite barium stannate material, including the following steps:

(1) Weighing out a barium source, a tetravalent tin source, an $A^{3+}$ source and a $B^{5+}$ source, respectively, according to the chemical general formula;

(2) Mixing the above sources thoroughly and ball-milling, and then drying to obtain homogeneous mixed powder;

(3) Placing the mixed powder obtained in step (2) into an alumina crucible, and performing calcination treatment on the mixed powder to obtain calcined powder;

(4) Adding sintering aid, $B_2O_3$, to the calcined powder, and then ball-milling again and drying to obtain prepared powder; and (5) Pressing the prepared powder obtained in step (4) to get pellets, followed by sintering the pellets to obtain the doped perovskite barium stannate material.

Preferably, the barium source is $BaCO_3$, $Ba(NO_3)_2$, $Ba(NO_3)_2$ hydrates, $BaSO_4$, $BaSO_4$ hydrates, $Ba(OH)_2$, $Ba(OH)_2$ hydrates, $Ba(C_2H_3O_2)_2$, $Ba(C_2H_3O_2)_2$ hydrates, $Ba_3(PO_4)_2$, or $Ba_3(PO_4)_2$ hydrates, or a mixture of two or more of these.

Preferably, the tin source is $SnO_2$.

Preferably, the $A^{3+}$ source is $A_2O_3$, $A_2(C_2O_4)_3$, $A_2(C_2O_4)_3$ hydrates, $A(NO_3)_3$, $A(NO_3)_3$ hydrates, $A_2(SO_4)_3$, $A_2(SO_4)_3$ hydrates, $A_2(CO_3)_3$, $A_2(CO_3)_3$ hydrates, $A(C_2H_3O_2)_3$, or $A(C_2H_3O_2)_3$ hydrates, or a mixture of two or more of these.

Preferably, the $B^{5+}$ source is $B_2O_5$.

Preferably, in step (3), the detailed parameters of the calcination treatment contain heating temperature: 1000° C.-1200° C., heating rate: 4° C./min-6° C./min, holding time: 3 hours. After calcination, it naturally cools down to room temperature.

Preferably, in step (4), the weight ratio of the sintering aid, $B_2O_3$, to the calcined powder is 0.5% to 5%.

Preferably, the preparation method further comprises of step (6) after step (5): performing surface polishing treatment on the doped perovskite barium stannate material obtained in step (5) and then annealing. The annealing can eliminate space charge, thereby optimizing the dielectric performance of the doped perovskite barium stannate material. In the doping level of $0<x\leq0.025$, it can be determined whether the dielectric constant of the obtained material is frequency-dependent. If the dielectric constant is frequency-dependent, it can be optimized by annealing. However, if $x>0.025$, the performance of the obtained material cannot be further improved through annealing.

Preferably, the detailed parameters of annealing contain temperature: 1000° C.-1500° C., heating rate: 1.5° C./min-15° C./min, holding time: 1-24 hours, atmosphere: air. After annealing, it naturally cools down to room temperature.

Preferably, the surface polishing treatment includes rough polishing with 240-mesh sandpaper, and then fine polishing with 1200-mesh sandpaper.

Preferably, in step (5), the pressing is performed at a pressure of at least 1 MPa.

Preferably, in step (5), the detailed parameters of sintering include heating temperature: 1300° C.-1500° C., heating rate: 4° C./min-6° C./min, holding time: 6-24 hours. After sintering, it naturally cools down to room temperature.

Preferably, in step (3) and step (4), the ball-milling is carried out for at least 12 hours with yttrium-stabilized zirconia beads as a medium and ethanol and/or acetone as solution.

Preferably, the calcination treatment in step (3) and the sintering in step (5) are performed in air or nitrogen.

A further objective of the invention is to provide application of the doped perovskite barium stannate material in low-frequency ceramic capacitors or microwave communication dielectric ceramics.

By adopting the aforementioned technical solution, the invention has the following advantages: the structure of the doped perovskite barium stannate material provided in the invention has been chemically modified by co-doping +3 and +5 metal ions, so that the doped perovskite barium stannate material of the invention has optimized dielectric properties and simultaneously exhibits excellent properties of high dielectric constant, low dielectric loss and good temperature-stability, thereby meeting the application requirements of microwave dielectric ceramics; a preparation method of the doped perovskite barium stannate material is also provided in the invention, and the process is simple. Therefore, the doped perovskite barium stannate material can be industrially manufactured. The invention also provides the potential application of the doped perovskite barium stannate material in a low-frequency ceramic capacitor or microwave communication.

DETAILED DESCRIPTION

Figure 1:
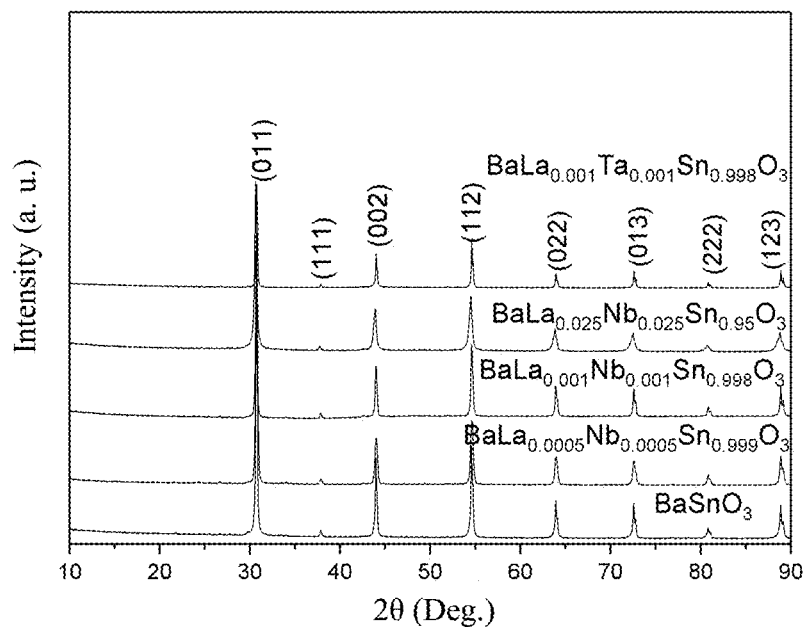
FIG. 1 shows XRD spectra of ($A^{3+}$+$B^{5+}$) co-doped perovskite barium stannate materials prepared in Example 1 ($BaLa_{0.0005}Nb_{0.0005}Sn_{0.999}O_3$), Example 2 ($BaLa_{0.001}Nb_{0.001}Sn_{0.998}O_3$), Example 3 ($BaLa_{0.025}Nb_{0.025}Sn_{0.95}O_3$), and Example 4 ($BaLa_{0.001}Ta_{0.001}Sn_{0.998}O_3$), as well as an un-doped perovskite barium stannate material prepared in Comparative Example 1 ($BaSnO_3$)

Hereafter, the invention will be further described in conjunction with specific examples in order to better illustrate objectives, technical solutions and advantages.

Example 1

A doped perovskite barium stannate material in Example 1 has a chemical general formula: $BaA_xB_xSn_{1-2x}O_3$, where A=La, B=Nb, x is an atomic ratio and x=0.0005. The doped perovskite barium stannate material is prepared through the following steps:

(1) According to the chemical general formula, weighing out 19.7340 g $BaCO_3$ reactant powder, 15.0559 g $SnO_2$ reactant powder, 0.0082 g $La_2O_3$ reactant powder and 0.0066 g $Nb_2O_5$ reactant powder, respectively;

(2) Placing the abovementioned reactant powders into a ball milling tank, and ball-milling for 12 hours with ethanol as solution and yttrium-stabilized zirconia beads as a ball-milling medium, then mixing uniformly and drying to get homogeneous mixed powder;

(3) Placing the mixed powder obtained in step (2) into an alumina crucible for calcination treatment, in particular, carrying out the calcination treatment at 1,000° C. for 3 hours in air with the heating rate of 5° C./min, and then naturally cooling down to room temperature;

(4) After the calcination treatment, adding 2.5 wt. % $B_2O_3$ into the mixed powder, and then performing ball-milling again under the same conditions as that of step (2) and drying to get preliminary powder; and (5) Placing the preliminary powder obtained in step (4) into a die, pressing under a pressure of 1 MPa to get green pellets, and then sintering the green pellets at 1,350° C. for 12 hours in air with the heating rate of 5° C./min, and then naturally cooling down to room temperature to get a dense doped perovskite barium stannate material.

Example 2

A doped perovskite barium stannate material in Example 2 has a chemical general formula: $BaA_xB_xSn_{1-2x}O_3$, where A=La, B=Nb, x is an atomic ratio and x=0.001. The doped perovskite barium stannate material is prepared through the following steps:

(1) According to the chemical general formula, weighing out 19.7340 g $BaCO_3$ reactant powder, 15.0409 g $SnO_2$ reactant powder, 0.0163 g $La_2O_3$ reactant powder and 0.0133 g $Nb_2O_5$ reactant powder, respectively;

(2) Placing the above-mentioned reactant powders into a ball milling tank, and ball-milling for 12 hours with ethanol as solution and yttrium-stabilized zirconia beads as a ball-milling medium, then mixing uniformly and drying to give homogeneous mixed powder;

(3) Placing the mixed powder obtained in step (2) into an alumina crucible for calcination treatment, in particular, carrying out the calcination treatment at 1,000° C. for 3 hours in air with the heating rate of 5° C./min, and then naturally cooling down to room temperature;

(4) After the calcination treatment, adding 2.5 wt. % $B_2O_3$ into the mixed powder, and then performing ball-milling again under the same conditions as that of step (2) and drying to get preliminary powder; and (5) Placing the preliminary powder obtained in step (4) into a die, pressing under a pressure of 1 MPa to get green pellets, and then sintering the green pellets at 1,350° C. for 12 hours in air with the heating rate of 5° C./min, and then naturally cooling down to room temperature to get a dense doped perovskite barium stannate material.

Example 3

A doped perovskite barium stannate material in Example 3 has a chemical general formula: $BaA_xB_xSn_{1-2x}O_3$, where A=La, B=Nb, x is an atomic ratio and x=0.025. The doped perovskite barium stannate material is prepared through the following steps:

(1) According to the chemical general formula, weighing out 19.7340 g $BaCO_3$ reactant powder, 14.3145 g $SnO_2$ reactant powder, 0.4073 g $La_2O_3$ reactant powder and 0.3323 g $Nb_2O_5$ reactant powder, respectively;

(2) Placing the above-mentioned reactant powders into a ball milling tank, and ball-milling for 12 hours with ethanol as solution and yttrium-stabilized zirconia beads as a ball-milling medium, then mixing uniformly and drying to get homogeneous mixed powder;

(3) Placing the mixed powder obtained in step (2) into an alumina crucible for calcination treatment, in particular, carrying out the calcination treatment at 1,000° C. for 3 hours in air with the heating rate of 5° C./min, and naturally cooling down to room temperature;

(4) After the calcination treatment, adding 0.5 wt. % $B_2O_3$ into the mixed powder, and then performing ball-milling again under the same conditions as that of step (2) and drying to get preliminary powder;

(5) Placing the preliminary powder obtained in step (4) into a die, pressing under a pressure of 1 MPa to get green pellets, and then sintering the green pellets at 1,500° C. for 6 hours in air with the heating rate of 5° C./min, and then naturally cooling down to room temperature to get dense doped perovskite barium stannate ceramic pellets; and (6) Performing surface polishing on the ceramic pellets obtained in step (5), and then annealing to obtain the doped perovskite barium stannate material; the surface polishing treatment includes rough polishing with 240-mesh sandpaper and then fine polishing with 1200-mesh sandpaper; and the annealing is carried out at 1,300° C. for 1 hour in air with the heating rate of 5° C./min.

Example 4

A doped perovskite barium stannate material in Example 4 has a chemical general formula: $BaA_xB_xSn_{1-2x}O_3$, where A=La, B=Ta, x is the atomic ratio and x=0.001. The doped perovskite barium stannate material is prepared through the following steps:

(1) According to the chemical general formula, weighing out 19.7340 g $BaCO_3$ reactant powder, 15.0409 g $SnO_2$ reactant powder, 0.0163 g $La_2O_3$ reactant powder and 0.0221 g $Ta_2O_5$ reactant powder, respectively;

(2) Placing the above-mentioned reactant powders into a ball milling tank, and ball-milling for 12 hours with ethanol as solution and yttrium-stabilized zirconia beads as a ball-milling medium, then mixing uniformly and drying to get homogeneous mixed powder;

(3) Placing the mixed powder obtained in step (2) into an alumina crucible for calcination treatment, in particular, carrying out the calcination treatment at 1,000° C. for 3 hours in air with the heating rate of 5° C./min;

(4) After the calcination treatment, adding 2.5 wt. % $B_2O_3$ into the mixed powder, and then performing ball-milling again under the same conditions as that of step (2) and drying to get preliminary powder; and (5) Placing the preliminary powder obtained in step (4) into a die, pressing under a pressure of 1 MPa to get green pellets, and then sintering the green pellets at 1,500° C. for 24 hours in air with the heating rate of 5° C./min, and then naturally cooling down to room temperature to get a dense doped perovskite barium stannate material.

Comparative Example 1

In the comparative example, $BaSnO_3$ is prepared through the following steps:

(1) According to the chemical general formula $BaSnO_3$, weighing out 19.7340 g $BaCO_3$ reactant powder and 15.071 g $SnO_2$ reactant powder, respectively;

(2) Placing the above-mentioned reactant powders into a ball milling tank, and ball-milling for 12 hours with ethanol as solution and yttrium-stabilized zirconia beads as ball-milling medium, then mixing uniformly and drying to get homogeneous mixed powder;

(3) Placing the mixed powder obtained in step (2) into an alumina crucible for calcination treatment, in particular, carrying out the calcination treatment at 1,200° C. for 3 hours in air with the heating rate of 5° C./min, and naturally cooling down to room temperature;

(4) After the calcination treatment, adding 5 wt. % $B_2O_3$ into the mixed powder, and then performing ball-milling again under the same conditions as that of step (2) and drying to get preliminary powder; and (5) Placing the preliminary powder obtained in step (4) into a die, pressing under a pressure of 1 MPa to get green pellets, and then sintering the green pellets at 1,450° C. for 12 hours in air with the heating rate of 5° C./min, and then naturally cooling down to room temperature to get a dense doped perovskite barium stannate material.

FIG. 1 shows XRD spectra of ($A^{3+}+B^{5+}$) co-doped perovskite barium stannate materials prepared in Example 1 ($BaLa_{0.0005}Nb_{0.0005}Sn_{0.999}O_3$), Example 2 ($BaLa_{0.001}Nb_{0.001}Sn_{0.998}O_3$), Example 3 ($BaLa_{0.025}Nb_{0.025}Sn_{0.95}O_3$), and Example 4 ($BaLa_{0.001}Ta_{0.001}Sn_{0.998}O_3$), as well as an un-doped perovskite barium stannate material prepared in Comparative Example 1 ($BaSnO_3$). FIG. 1 shows that the ($A^{3+}+B^{5+}$) co-doped perovskite barium stannate materials prepared in Examples 1 to 4 and the un-doped perovskite barium stannate material prepared in Comparative Example 1 (BaSnO$_3$) have the same cubic perovskite structure, and all are single phase.

Figure 2A:
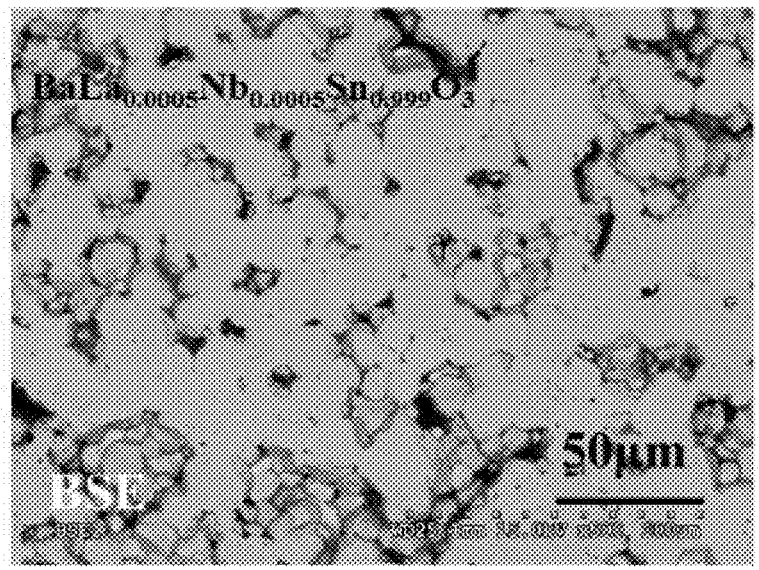
FIGS. 2a-2c are backscattered electron (BSE) images of (La+Nb) co-doped perovskite barium stannate materials prepared in Example 1 ($BaLa_{0.0005}Nb_{0.0005}Sn_{0.999}O_3$), Example 2 ($BaLa_{0.001}Nb_{0.001}Sn_{0.998}O_3$), and Example 3 ($BaLa_{0.025}Nb_{0.025}Sn_{0.95}O_3$)
Figure 2B:
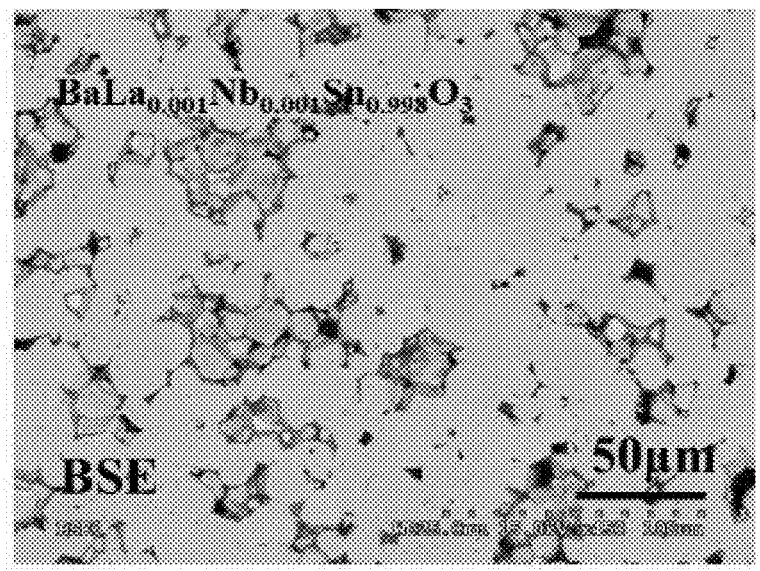
Figure 2C:
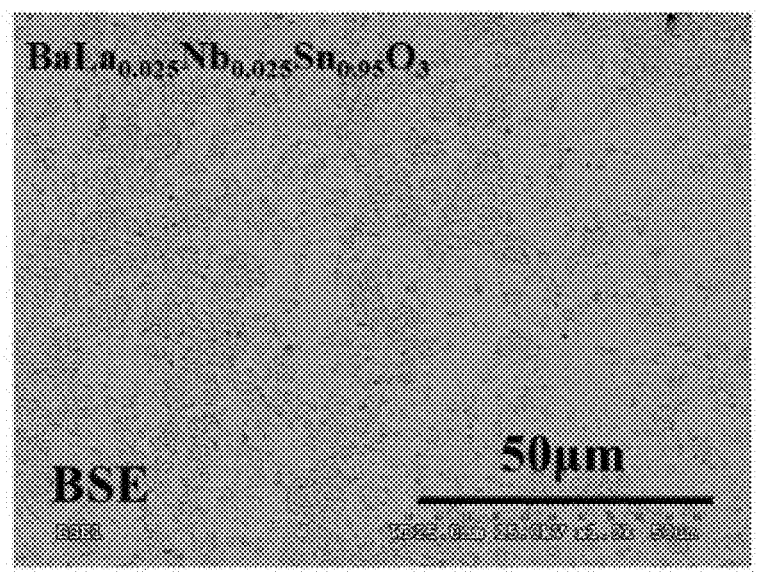
Figure 2D:
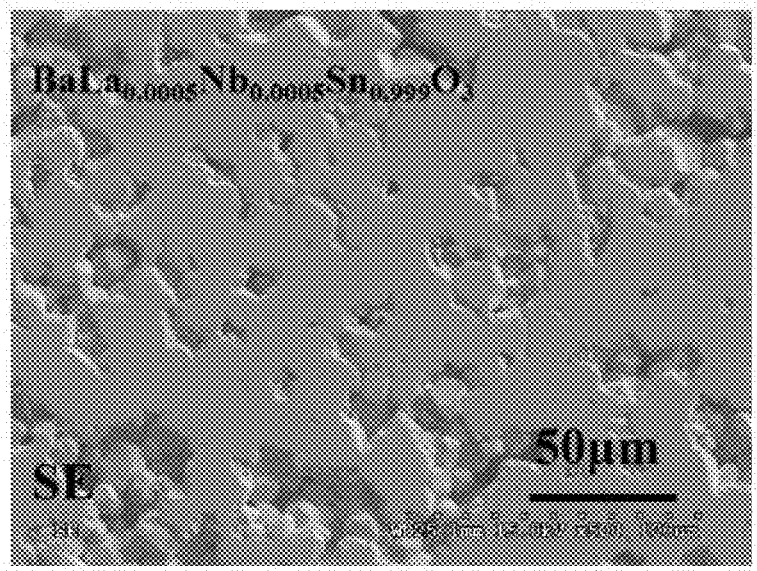
FIGS. 2d-2f are corresponding secondary electron (SE) images of (La+Nb) co-doped perovskite barium stannate materials prepared in Example 1 ($BaLa_{0.0005}Nb_{0.0005}Sn_{0.999}O_3$), Example 2 ($BaLa_{0.001}Nb_{0.001}Sn_{0.998}O_3$), and Example 3 ($BaLa_{0.025}Nb_{0.025}Sn_{0.95}O_3$)
Figure 2E:
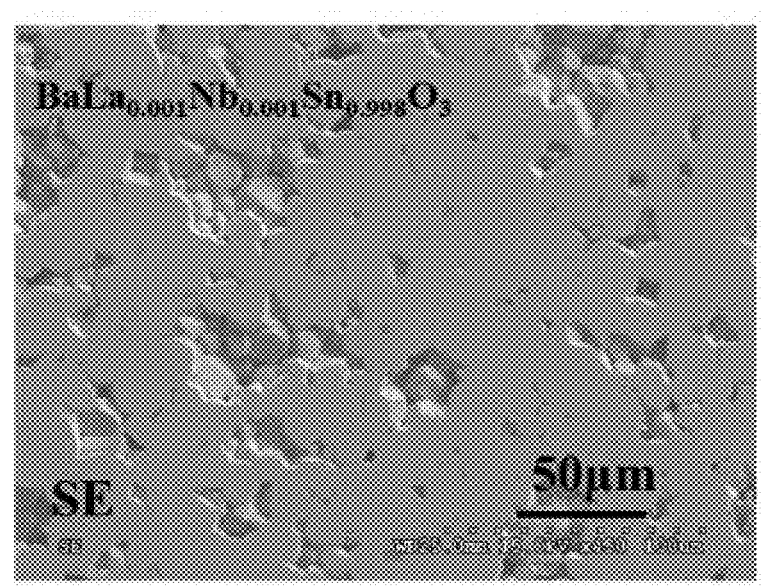
Figure 2F:
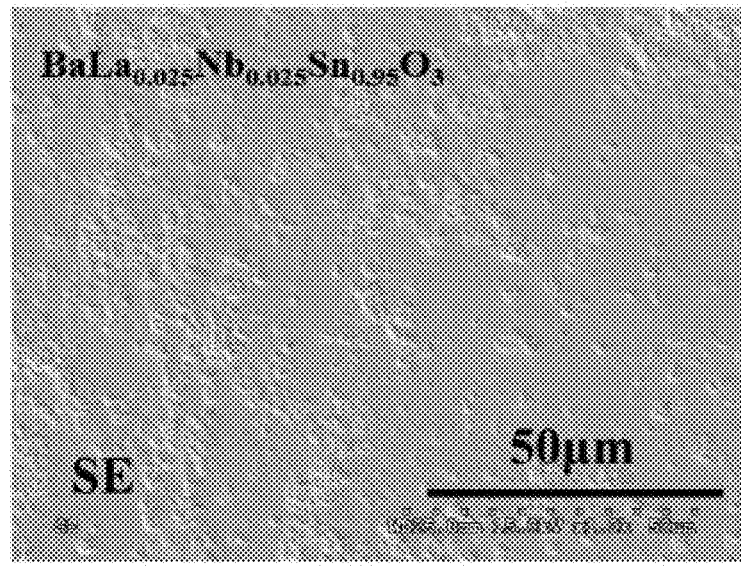

FIGS. 2a-2c are backscattered electron (BSE) images and secondary electron (SE) images of (La+Nb) co-doped perovskite barium stannate materials prepared in Example 1 (BaLa$_{0.0005}$Nb$_{0.0005}$Sn$_{0.999}$O$_3$), Example 2 (BaLa$_{0.001}$Nb$_{0.001}$Sn$_{0.998}$O$_3$), and Example 3 (BaLa$_{0.025}$Nb$_{0.025}$Sn$_{0.95}$O$_3$); and FIGS. 2d-2f are corresponding secondary electron (SE) images of (La+Nb) co-doped perovskite barium stannate materials prepared in Example 1 (BaLa$_{0.0005}$Nb$_{0.0005}$Sn$_{0.999}$O$_3$), Example 2 (BaLa$_{0.001}$Nb$_{0.001}$Sn$_{0.998}$O$_3$), and Example 3 (BaLa$_{0.025}$Nb$_{0.025}$Sn$_{0.95}$O$_3$). FIGS. 2a-2f further prove that the (La+Nb) co-doped perovskite barium stannate materials prepared in Examples 1 to 3 are single-phase and contain no impurities.

Figure 3:
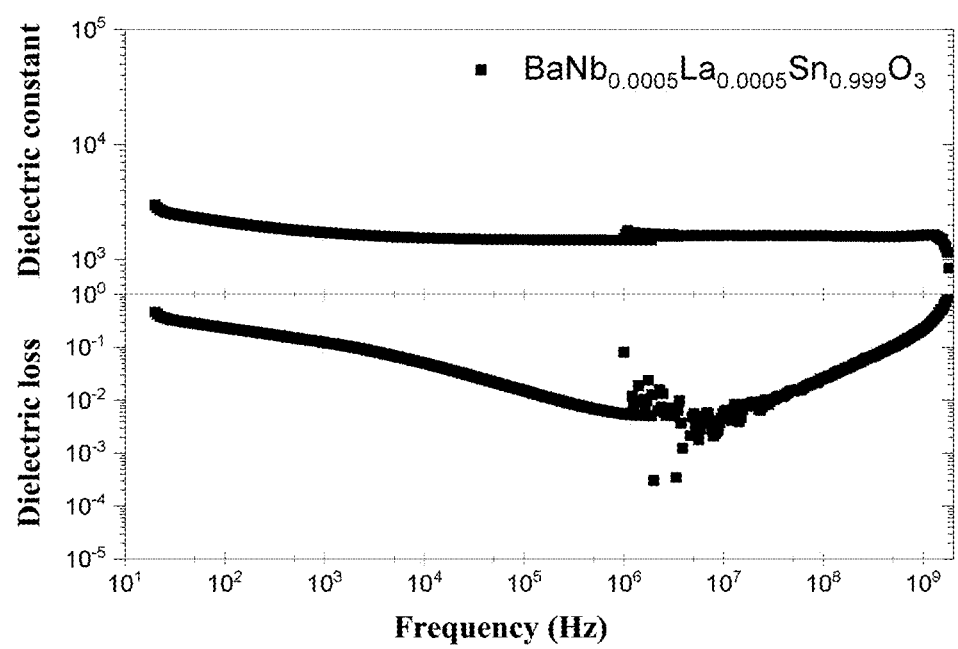
FIG. 3 shows the frequency-dependent dielectric properties of a (La+Nb) co-doped perovskite barium stannate material prepared in Example 1 ($BaLa_{0.0005}Nb_{0.0005}Sn_{0.999}O_3$), which were measured at room temperature.

FIG. 3 shows the frequency-dependent dielectric properties of a (La+Nb) co-doped perovskite barium stannate material prepared in Example 1 (BaLa$_{0.0005}$Nb$_{0.0005}$Sn$_{0.999}$O$_3$), which were measured at room temperature. FIG. 3 implies that the (La+Nb) co-doped perovskite barium stannate material prepared in Example 1 (BaLa$_{0.0005}$Nb$_{0.0005}$Sn$_{0.999}$O$_3$) has a dielectric constant in a range from 1.6×10$^3$ to 3×10$^3$ at a frequency range of 20 Hz to 1 GHz, and has dielectric loss less than 1% at frequency range of 0.2 MHz to 25 MHz.

Figure 4:
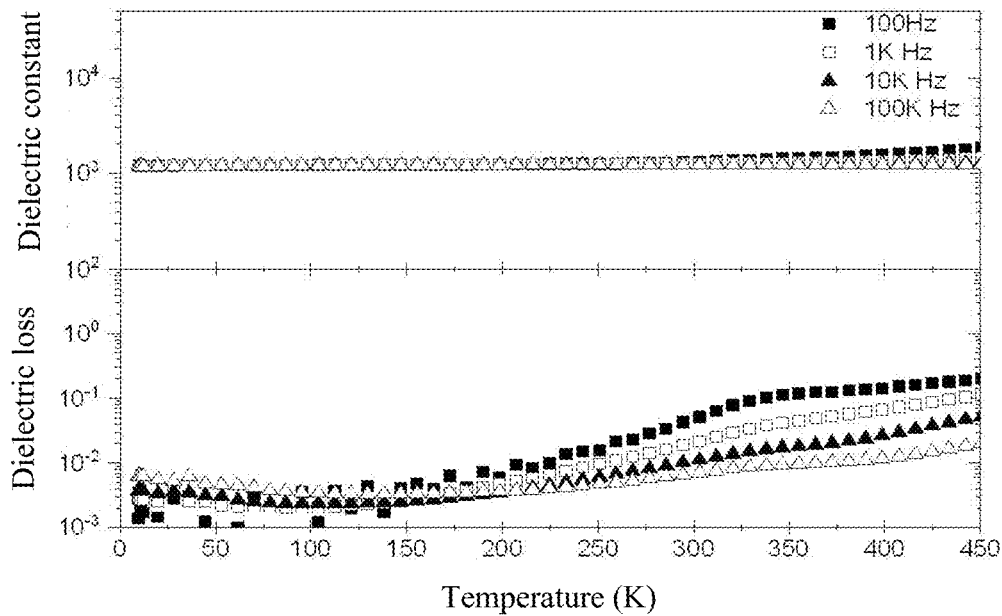
FIG. 4 shows the temperature-dependent dielectric properties of a (La+Nb) co-doped perovskite barium stannate material prepared in Example 1 ($BaLa_{0.0005}Nb_{0.0005}Sn_{0.999}O_3$) with four selected frequencies (100 Hz, 1 kHz, 10 kHz and 100 kHz)

FIG. 4 shows the temperature-dependent dielectric properties of a (La+Nb) co-doped perovskite barium stannate material prepared in Example 1 (BaLa$_{0.0005}$Nb$_{0.0005}$Sn$_{0.999}$O$_3$) with four selected frequencies (100 Hz, 1 kHz, 10 kHz and 100 kHz). FIG. 4 implies that the (La+Nb) co-doped perovskite barium stannate material prepared in Example 1 (BaLa$_{0.0005}$Nb$_{0.0005}$Sn$_{0.999}$O$_3$) has a dielectric constant in a range from 1.2×10$^3$ to 3×10$^3$, which is temperature independent at the temperature range of 10 K to 450 K, and its dielectric loss is less than 5% below 300 K.

Figure 5:
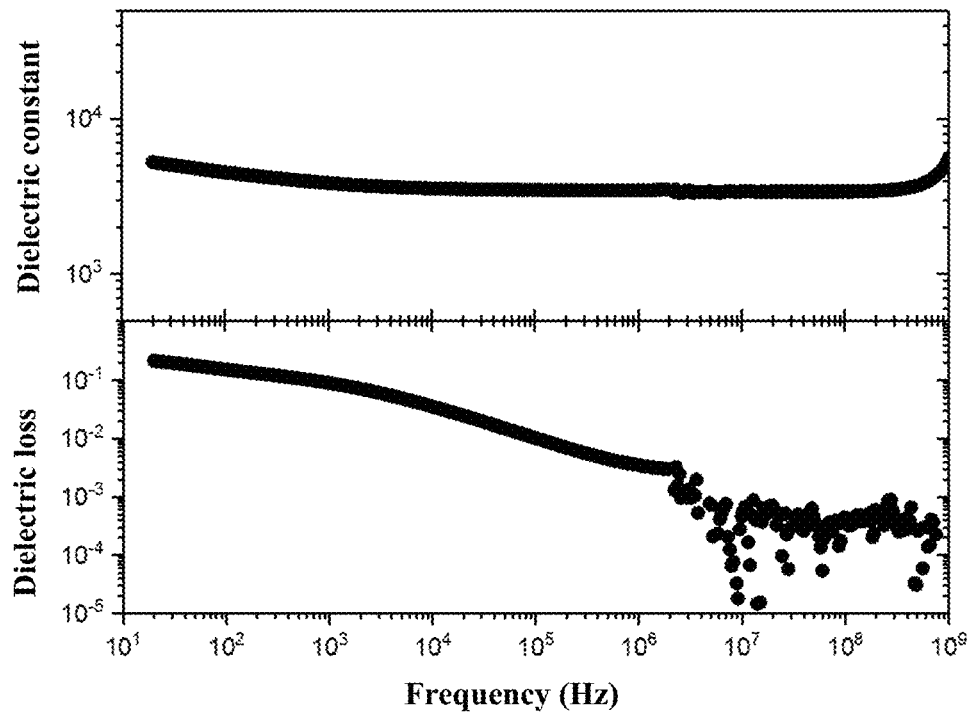
FIG. 5 shows the frequency-dependent dielectric properties of a (La+Nb) co-doped perovskite barium stannate material prepared in Example 2 ($BaLa_{0.001}Nb_{0.001}Sn_{0.998}O_3$), which were measured at room temperature.

FIG. 5 shows the frequency-dependent dielectric properties of a (La+Nb) co-doped perovskite barium stannate material prepared in Example 2 (BaLa$_{0.001}$Nb$_{0.001}$Sn$_{0.998}$O$_3$), which were measured at room temperature. FIG. 5 implies that the (La+Nb) co-doped perovskite barium stannate material prepared in Example 2 (BaLa$_{0.001}$Nb$_{0.001}$Sn$_{0.998}$O$_3$) has a dielectric constant in a range from 3.5×10$^3$ to 5×10$^3$ at a frequency range of 20 Hz to 1 GHz, and its dielectric loss is less than 4% after 1 MHz, and less than 0.5% after 300 MHz.

Figure 6:
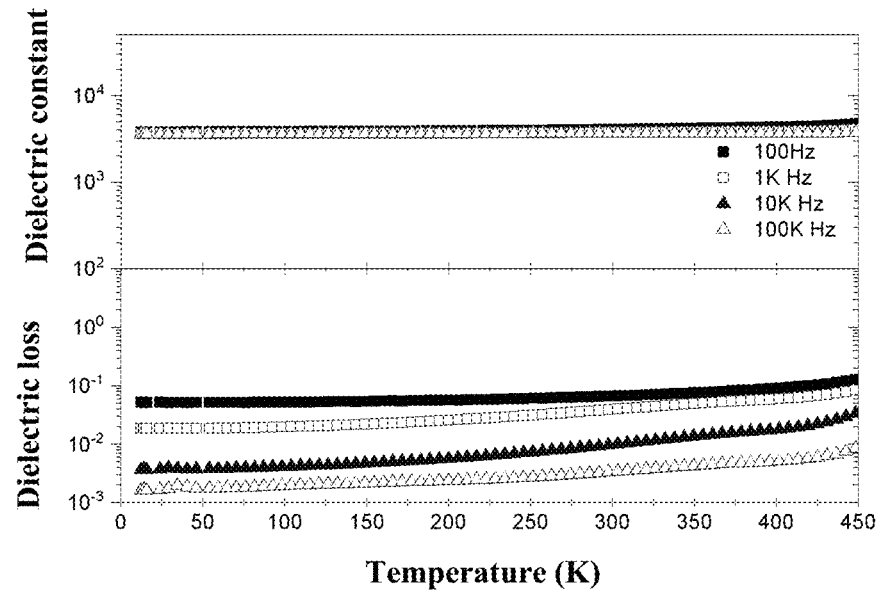
FIG. 6 shows the temperature-dependent dielectric properties of a (La+Nb) co-doped perovskite barium stannate material prepared in Example 2 ($BaLa_{0.001}Nb_{0.001}Sn_{0.998}O_3$) with four selected frequencies (100 Hz, 1 kHz, 10 kHz and 100 kHz)

FIG. 6 shows the temperature-dependent dielectric properties of a (La+Nb) co-doped perovskite barium stannate material prepared in Example 2 (BaLa$_{0.001}$Nb$_{0.001}$Sn$_{0.998}$O$_3$) with four selected frequencies (100 Hz, 1 kHz, 10 kHz and 100 kHz). FIG. 6 implies that the (La+Nb) co-doped perovskite barium stannate material prepared in Example 2 (BaLa$_{0.001}$Nb$_{0.001}$Sn$_{0.998}$O$_3$) has a dielectric constant in a range from 3.6×10$^3$ to 4.8×10$^3$, which is temperature independent from 10 K to 450 K, and its dielectric loss depends on temperature a little.

Figure 7:
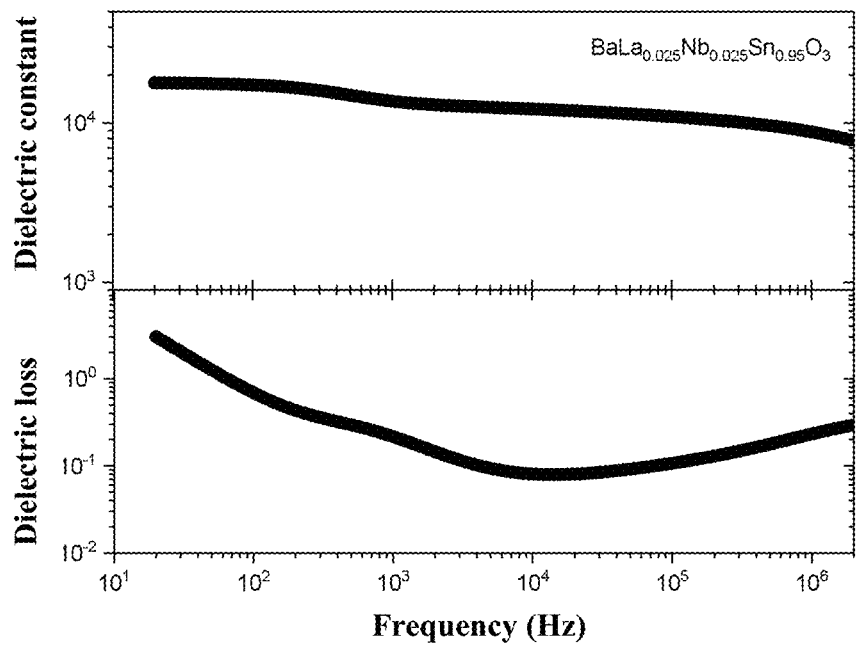
FIG. 7 shows the frequency-dependent dielectric properties of a (La+Nb) co-doped perovskite barium stannate material prepared in Example 3 ($BaLa_{0.025}Nb_{0.025}Sn_{0.95}O_3$), which were measured at room temperature.

FIG. 7 shows the frequency-dependent dielectric properties of a (La+Nb) co-doped perovskite barium stannate material prepared in Example 3 (BaLa$_{0.025}$Nb$_{0.025}$Sn$_{0.95}$O$_3$), which were measured at room temperature. FIG. 7 implies that the (La+Nb) co-doped perovskite barium stannate material prepared in Example 3 (BaLa$_{0.025}$Nb$_{0.025}$Sn$_{0.95}$O$_3$) has a dielectric constant in a range from 1.8×10$^4$ to 8×10$^3$ at the frequency range of 20 Hz to 2 MHz, and its dielectric loss decreases from 3 to 8% when the frequency increases from 20 Hz to 1.2×10$^4$ Hz, and the dielectric loss gradually increases to 30% as frequency continues to increase.

Figure 8:
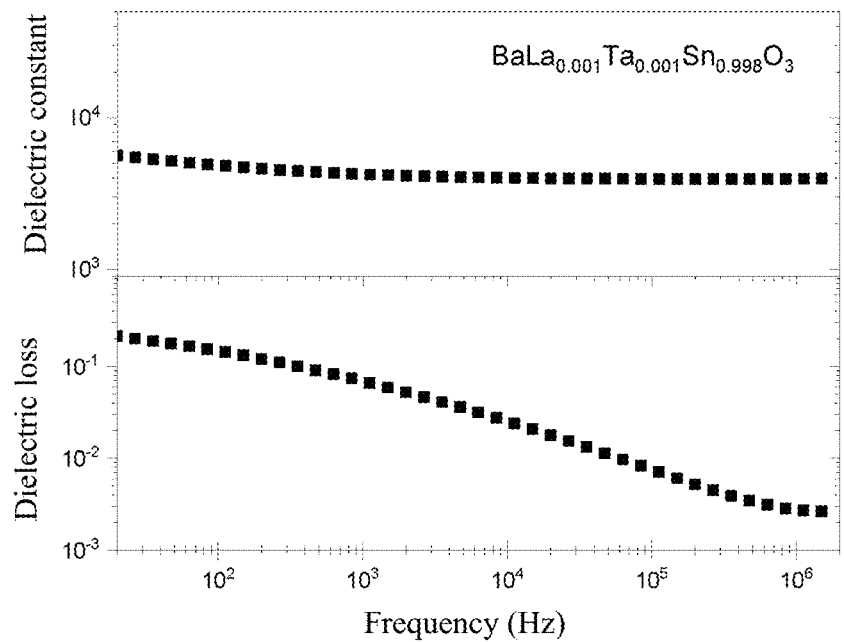
FIG. 8 shows the frequency-dependent dielectric properties of a (La+Nb) co-doped perovskite barium stannate material prepared in Example 4 ($BaLa_{0.001}Ta_{0.001}Sn_{0.998}O_3$), which were measured at room temperature.

FIG. 8 shows the frequency-dependent dielectric properties of a (La+Ta) co-doped perovskite barium stannate material prepared in Example 4 (BaLa$_{0.001}$Ta$_{0.001}$Sn$_{0.998}$O$_3$), which were measured at room temperature. FIG. 8 implies that the (La+Ta) co-doped perovskite barium stannate material prepared in Example 4 (BaLa$_{0.001}$Ta$_{0.001}$Sn$_{0.998}$O$_3$) has a dielectric constant in a range from 4×10$^3$ to 5.6×10$^3$ at the frequency range of 20 Hz to 2 MHz, and its dielectric loss decreases from 20% to 2.7% as the frequency increases.

Figure 9:
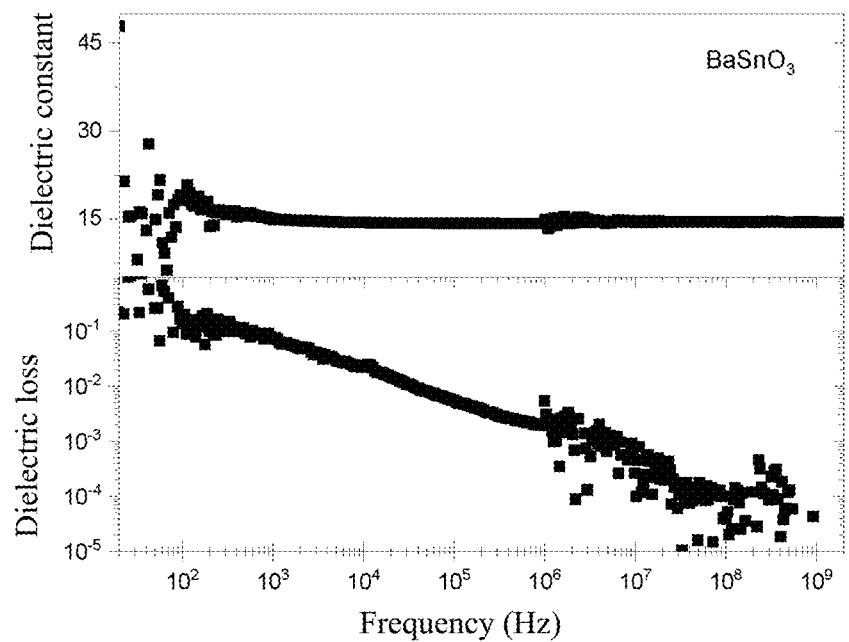
FIG. 9 shows the frequency-dependent dielectric properties of an un-doped perovskite barium stannate material prepared in Comparative Example 1 ($BaSnO_3$), which were measured at room temperature.

FIG. 9 shows the frequency-dependent dielectric properties of an un-doped perovskite barium stannate material prepared in Comparative Example 1 (BaSnO$_3$), which were measured at room temperature. FIG. 9 implies that the un-doped perovskite barium stannate material prepared in Comparative Example 1 (BaSnO$_3$) has a dielectric constant of 15 at the frequency range of 20 Hz to 1 GHz, and its dielectric loss decreases from 20% to 0.05% as the frequency increases.

Finally, it should be noted that the above examples are only used to illustrate the technical solutions of the invention and are not intended to limit the protection scope of the invention. Although the invention has been described in detail with references to the preferred examples, those of ordinary skill in this field should understand that, the technical solution of the invention can be modified or equivalently replaced without deviating from the essence and scope of the technical solution of the invention.

The invention claimed is:

1. A preparation method of a doped perovskite barium stannate material, the doped perovskite barium stannate material has a chemical general formula:

BaA$_x$R$_x$Sn$_{1-2x}$O$_3$, where A is In, Y, Bi, or La, or a mixture of two or more of these; R is Nb or Ta, or a mixture of both; and 0<x≤0.025, wherein the preparation method comprises of the following steps:
(1) Weighing out a barium source, a tetravalent tin source, an A$^{3+}$ source and a R$^{5+}$ source, respectively, according to the chemical general formula;
(2) Mixing the above sources thoroughly and ball-milling, and then drying to obtain homogeneous mixed powder;
(3) Placing the mixed powder obtained in step (2) into an alumina crucible, and performing calcination treatment on the mixed powder to obtain calcined powder;
(4) Adding sintering aid, B$_2$O$_3$, to the calcined powder, and then ball-milling again and drying to obtain preliminary powder; and
(5) Pressing the preliminary powder obtained in step (4) to get pellets, followed by sintering the pellets to obtain the doped perovskite barium stannate material.

2. The preparation method of a doped perovskite barium stannate material of claim 1, wherein at least one of the following requirements (a) to (d) is satisfied:
(a) The barium source is BaCO$_3$, Ba(NO$_3$)$_2$, Ba(NO$_3$)$_2$ hydrates, BaSO$_4$, BaSO$_4$ hydrates, Ba(OH)$_2$, Ba(OH)$_2$ hydrates, Ba(C$_2$H$_3$O$_2$)$_2$, Ba(C$_2$H$_3$O$_2$)$_2$ hydrates, Ba$_3$(PO$_4$)$_2$, or Ba$_3$(PO$_4$)$_2$ hydrates, or a mixture of two or more of these;
(b) The tin source is SnO$_2$;
(c) The A$^{3+}$ source is A$_2$O$_3$, A$_2$(C$_2$O$_4$)$_3$, A$_2$(C$_2$O$_4$)$_3$ hydrates, A(NO$_3$)$_3$, A(NO$_3$)$_3$ hydrates, A$_2$(SO$_4$)$_3$, $A_2(SO_4)_3$ hydrates, $A_2(CO_3)_3$, $A_2(CO_3)_3$ hydrates, $A(C_2H_3O_2)_3$, or $A(C_2H_3O_2)_3$ hydrates, or a mixture of two or more of these; and (d) The $R^{5+}$ source is $R_2O_5$.

3. The preparation method of a doped perovskite barium stannate material of claim 1, wherein in step (3), the calcination treatment comprises heating to a temperature in a range from 1000° C. to 1200° C. for 3 hours with a heating rate of 4° C./min to 6° C./min, and naturally cooling down to room temperature.

4. The preparation method of a doped perovskite barium stannate material of claim 1, wherein in step (4), a weight ratio of the sintering aid, $B_2O_3$, to the calcined powder is 0.5% to 5%.

5. The preparation method of a doped perovskite barium stannate material of claim 1, wherein the preparation method further comprises step (6) after step (5):

performing surface polishing treatment on the doped perovskite barium stannate material obtained in step (5) and then annealing.

6. The preparation method of a doped perovskite barium stannate material of claim 5, wherein the annealing comprises heating to a temperature in a range from 1000° C. to 1500° C. for 1 to 24 hours in air with a heating rate of 1.5° C./min to 15° C./min, and then naturally cooling down to room temperature.

7. The preparation method of a doped perovskite barium stannate material of claim 1, wherein in step (5), the sintering comprises heating to a temperature in a range from 1300° C. to 1500° C. for 6 to 24 hours in air with a heating rate of 4° C./min to 6° C./min, and then naturally cooling down to room temperature.

8. The preparation method of a doped perovskite barium stannate material of claim 1, wherein in step (3) and step (4), the ball-milling is carried out for at least 12 hours with yttrium-stabilized zirconia beads as a medium and ethanol and/or acetone as solution.

* * * * *